Feb. 26, 1957 L. M. BALLARD 2,783,095
METHODS FOR FORMING ROTARY BRUSHES
Filed Dec. 22, 1952
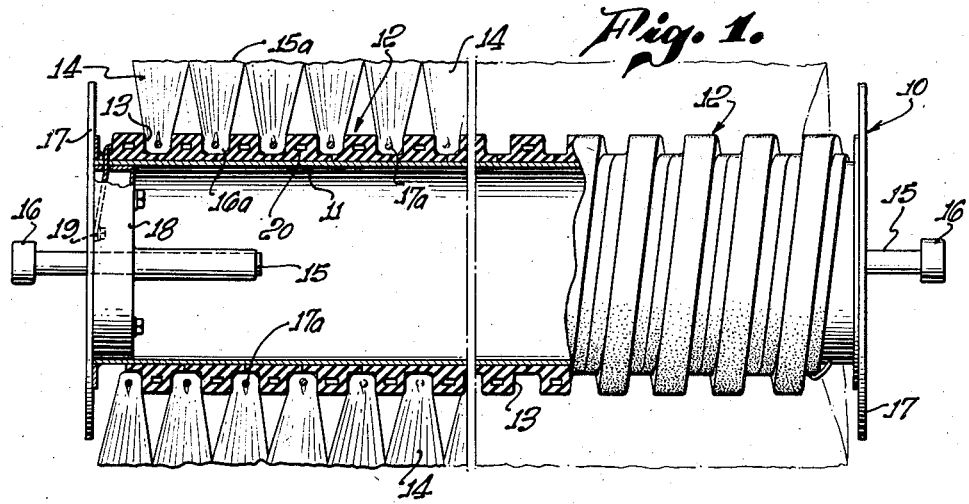
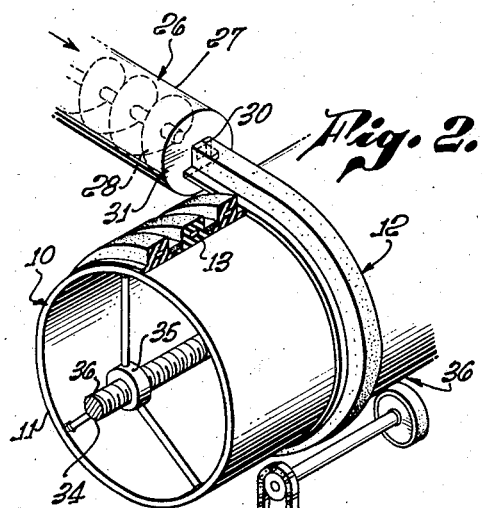
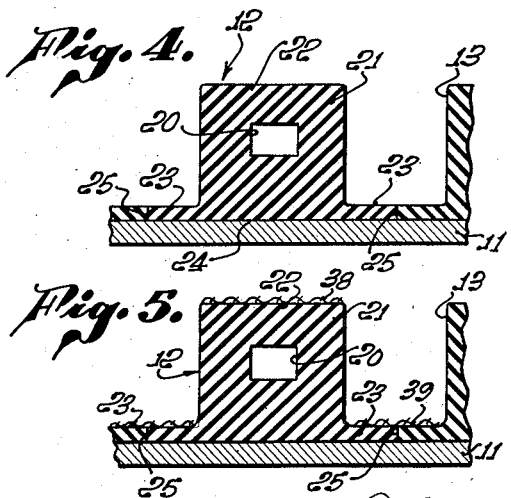
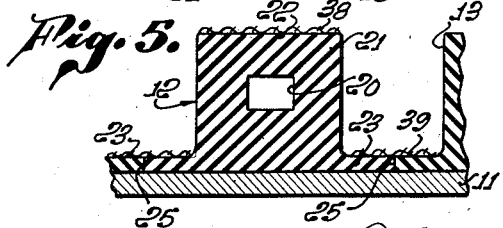
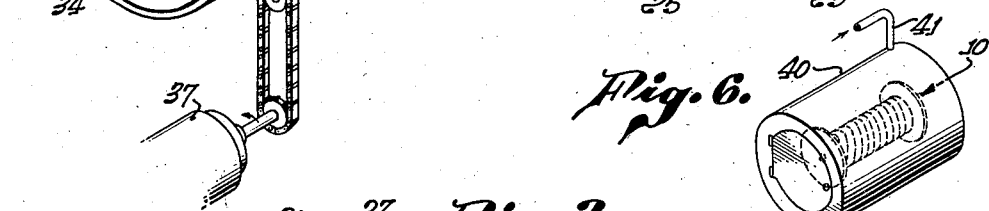
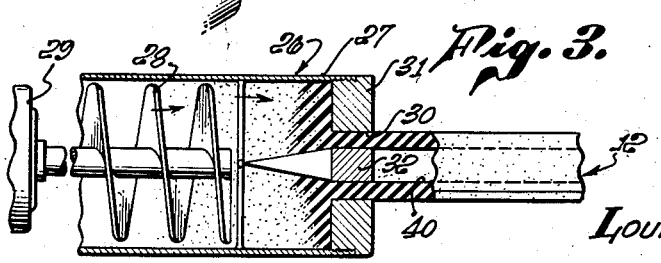
INVENTOR.
LOUIS M. BALLARD,
BY
ATTORNEY.

United States Patent Office 2,783,095
Patented Feb. 26, 1957

2,783,095

METHODS FOR FORMING ROTARY BRUSHES

Louis M. Ballard, Duarte, Calif., assignor to Wayne Manufacturing Company, Pomona, Calif., a corporation of California Application December 22, 1952, Serial No. 327,395

9 Claims. (Cl. 300—21)

This invention relates to improved methods for forming rotary brushes, and particularly for forming the bodies or core structures of such brushes.

In my copending application Number 327,393, filed Dec. 22, 1952, on Rotary Brushes I have shown a novel type of rotary brush which is especially adapted in certain respects for use in street sweepers. The brush of that application includes an inner core member, a body of rubber carried about the core member and containing an outwardly facing groove extending helically about the core, and bristles received and retained within that helical groove. The bristles are retained within the groove by a flexible wire, cable or other elongated member extending through inner looped portions of the bristles which are received in the mounting groove.

An object of the present invention is to provide improved methods for applying the helically grooved rubber to the inner core in a brush of the above type. Particularly contemplated is a method which is so constituted as to assure a most positive attachment of the rubber to the core member, while at the same time maintaining the method of application of the rubber as simple as possible.

In accordance with the invention, I first shape the rubber into an elongated body, and then wind that elongated body of rubber helically about the core, with the rubber being so shaped and wound as to form in its outer surface an outwardly facing groove extending helically about the core. The rubber is then tightly cemented or bonded to the core, which may be metal, following which the bristles are mounted within the helical groove.

In order to assure a most effective bond between the core and rubber, I find it desirable to wind the rubber on the core while in an uncured state, and to then cure the rubber in a manner bonding or vulcanizing it to the core. The rubber may be cured by heating, and preferably by merely surrounding it with steam, which may be under pressure. Also desirable is the provision of a cement between the core and rubber acting to retain the two parts together. Where such a cement is used in conjunction with an uncured rubber, both the rubber and cement may be cured after the winding of the rubber on the core, and preferably simultaneously.

The uncured rubber may be shaped into the desired elongated body by an extrusion process. The extruded rubber may have a portion which projects radially outwardly from the core, and between whose turns are formed the helical bristle-receiving groove. The extrusion may also be formed to provide between those turns a reduced dimension inner wall of the helical groove. In order to increase the bristle gripping resilience of the rubber, the radially projecting portion of the rubber may contain a passage extending longitudinally therethrough.

After winding the rubber on the core, I may wind about the rubber a flexible tape acting to retain the rubber against the core during curing. For best results, two such tapes are employed, one extending helically about the maximum diameter portion of the rubber, and the other extending about the reduced diameter portion within the helical groove.

The above and other features and objects of the present invention will be better understood from the following detailed description of the typical embodiment illustrated in the accompanying drawing, in which:

Fig. 1 is a partly sectional view of a rotary street sweeping broom constructed in accordance with the invention;

Fig. 2 is a fragmentary perspective view, partially diagrammatic, showing the method of application of the rubber bristle carrying member to the core of the Fig. 1 broom;

Fig. 3 is an enlarged fragmentary section through the rubber extruding apparatus of Fig. 2;

Fig. 4 is an enlarged fragmentary transverse section through a portion of the drum and bristle retaining members of Fig. 1;

Fig. 5 is a view corresponding to Fig. 4 but showing the manner in which tape is wound helically about the rubber bristle retaining member for holding the rubber to the broom drum during the rubber curing process; and Fig. 6 shows schematically a vulcanizing drum within which the rubber is steam cured.

Referring first to Fig. 1, the illustrated broom or brush 10 includes a hollow cylindrical rigid body or drum 11, about which is carried a tubular rubber bristle mounting member 12. This member 12, whose manner of formation will be discussed at a later point, contains an outwardly facing groove extending helically about the drum and receiving the inner portions of outwardly projecting bristles 14. The wall of drum 11 is preferably imperforate, and formed of a suitable rigid metal, as for instance steel. The drum is mounted for rotation by a pair of alined stub shafts 15 projecting from its opposite ends and journalled within bearings 16. Shafts 15 may be attached to drum 11, in alinement therewith, by a pair of plates 17 extending across the drum ends, and a pair of hollow sheet metal hub members 18 connected to plates 17 and the drum.

The groove 13 formed within rubber body 12 may be essentially rectangular in cross section, and preferably is substantially square as shown. This groove extends helically about the rubber body and along its entire axial extent. The bristles 14 are of the looped or essentially U-shaped type, each having two ends at the outer extremity 15a of the brush and being shaped to extend radially inwardly from one of those ends into groove 13, and then be curved back outwardly toward its second end. Each of the bristles thus has a looped portion 16a received within the helical groove 13 in the bristle mounting member. An elongated flexible retaining element 17a, preferably a wire or metal cable, extends helically about member 12 within its groove 13, and through the inner looped portions of all of the bristles 14, to tightly retain the inner portions of the bristles within the groove. The opposite ends of retaining element 17a are tightly fastened in fixed relation to the drum, so that the bristles are very effectively held in position. More specifically, each of the ends of element 17a may extend radially inwardly through openings in drum 11 and hollow hub member 18, and connect within the hub member at 19 to the corresponding end plate 17.

The rubber forming member 12 may be approximately the same as that utilized in automobile tire treads, preferably between about 70 and 80 Shore, and for best results about 75 Shore. Because of the resilience of this rubber bristle mounting member, the bristles 14 are very positively and effectively retained against accidental dislocation. This is true because it is possible, when member 12 is of a resilient nature, to form the groove 13 of a size such that the inner looped portions 16 of the bristles must be forced into the groove. As these looped portions of the bristles are then forced into the grooves, the groove walls are resiliently deformable in a manner permitting accommodation of the bristle loops, and then act to tightly embrace and positively retain those bristle loops after their insertion into position. Further, the resilience of the rubber member 12 permits some deformation of the bristle retaining groove walls in response to forces exerted against the bristles to provide a somewhat cushioned mounting member for the bristles acting to minimize the possibility of damage to their mounting portions. Such resilient deformability of the groove walls may be enhanced by providing in the rubber body 12, at a location between successive turns of the groove, an inner elongated air passage or chamber 20 extending helically about the drum. A further advantage of the use of rubber or other resilient material in the bristle mounting member 12 is that it prevents damage to this member in the event of engagement with a hard or abrasive object in use. This factor is of extreme importance when the brush is to be used in a street sweeper and may be required to handle various types of objects which might break or seriously damage a non-resilient bristle carrier.

To now describe the manner of formation of the rubber bristle mounting member 12, this member is formed from an elongated element 21 which has the cross section shown in Figs. 4 and 5 and is wound helically about drum 11 in a manner forming the desired bristle mounting groove 13. More specifically, element 21 has a central portion 22 of rectangular cross section, which projects radially outwardly from core 11 to form the walls of recess 13. Projecting laterally from opposite sides of portion 22, element 21 has a pair of side portions 23, which form the inner cylindrical wall of groove 13. At its radially inner side, element 21 has a planar surface, which fits against and is bonded to the outer surface of drum 11. As will be understood, successive turns of element 21 engage at 25 in a manner such that each of the lateral projections 23 forms ½ of the inner wall of groove 13. The successive turns of element 21 are bonded together at the location 25 where their lateral projections meet. The passage 20 within bristle mounting member 12 is formed by shaping elongated element 21 in a manner providing passage 20 within its outwardly projecting portion 22.

In order to assure tight bonding to drum 11, rubber element 21 is preferably wound about drum 11 in an uncured state, and is then cured while positioned about the drum, in a manner vulcanizing the rubber of element 21 directly to the drum. The strength of the bond may be further enhanced by roughening the outer cylindrical surface of drum 11, as by sand blasting it, prior to application of element 21 to its outer surface. Also, a suitable uncured preferably heat curing rubber bonding cement may be applied to the outer surface of the drum before applying element 21.

Elongated element 21 may be formed in an extremely simple manner by merely extruding the uncured rubber through an extruding press, such as is shown at 26 in Figs. 2 and 3. This press may include a cylinder 27 containing a screw 28, which is driven by a motor 29. Rotation of screw 28 acts to advance the rubber to the right as seen in Fig. 3, and to force it through opening 30 in an extruding die 31 at the end of the cylinder. Die opening 30 is shaped in correspondence with the desired cross-section of element 21 as seen in Fig. 4. Passage 20 within the extruded rubber element 21 is formed by mounting a rectangular element 32 within the center of die opening 30, element 32 typically being mounted from a web 33 within barrel 26.

To facilitate the winding of element 21 about drum 11, I may provide means for mechanically rotating the drum and simultaneously axially advancing it, in a manner winding the element helically about the drum as it is extruded from apparatus 26. Such drum advancing and rotating mechanism is shown typically to comprise a stationarily mounted screw 34 extending axially through the drum and engaging a pair of nuts 35 (only one shown) which are attached in any suitable manner in fixed relation to the drum, as by a web structure 135. The pitch of the screw and nut threads is equal to the axial dimension of element 21, so that upon rotation of the drum, it is automatically advanced by the screw and nut at a rate wrapping element 21 about the drum in the desired helical pattern. The drum may be rotated in any suitable manner, as by a roller 36 frictionally engaging the drum and driven by a motor 37.

After the uncured rubber has been wound about drum 11, the rubber is desirably retained to the drum by wrapping two tapes or strips of woven fabric 38 and 39 helically about the rubber (see Fig. 5). The first of these tapes 38 extends about the outer surface of portion 22 of element 21, while the second tape 38 extends about the portions of element 21 which form the inner wall of groove 13. This tape holds the rubber to the drum with just sufficient pressure (about 15 lbs. per square inch) to assure perfect bonding of the extrusion to the drum.

In this condition, the drum and its carried uncured rubber and retaining tape are inserted into a standard horizontal vulcanizing housing such as that shown schematically at 40 in Fig. 6. Steam is then injected into housing 40 through inlet 41, to surround the uncured rubber, and cure or vulcanize it. The temperature and pressure of the steam are of course determined by the characteristics of the particular rubber and bonding cement employed. Usually, the temperature is between about 300 and 400° F. and the pressure of the steam is around 80 lbs. per square inch. The steam cures the rubber of element 21 and the rubber cement interposed between that element and the drum, so that the extruded rubber is vulcanized tightly to the outer surface of the drum. Also, adjacent turns of the extrusion are vulcanized together at their point of contact 25, during the curing process.

After the rubber has been cured, the drum and rubber are removed from housing 40, and tapes 38 and 39 are then taken off of the cured rubber. Bristles 14 may then be retained within the helical groove 13 in the outer surface of the rubber in the manner previously described.

I claim:

1. The method of forming a rotary broom that includes forming an elongated body of at least partially uncured rubber, winding said elongated body of rubber helically about a broom core member, said body being so shaped and wound as to form an outwardly facing bristle receiving groove extending helically about the core, helically wrapping a flexible retaining tape about the uncured rubber body after its application to the core to retain the rubber against the core, heating and thereby curing said rubber under pressure after winding it about the core by surrounding the core and rubber with steam under pressure, and then removing said tape from the rubber body.

2. The method of forming a rotary broom that includes forming an elongated body of at least partially uncured rubber, winding said elongated body of rubber helically about a broom core member, said body being so shaped and wound as to form an outwardly facing bristle receiving groove extending helically about the core, helically wrapping a flexible member about the uncured rubber body after its application to the core to retain the rubber against the core, then heating and thereby curing said rubber, and then removing said flexible member from about the rubber.

3. The method of forming a rotary broom that includes extruding a mass of uncured rubber to form an elongated body thereof, winding said elongated body of rubber helically about a broom core member, said extruded rubber body being of such cross section as to have a portion projecting radially outwardly from the core between successive turns of which is formed an outwardly facing helical bristle receiving groove, said extruded rubber body having reduced dimension portions received axially between said turns of said outwardly projecting portion and forming an inner wall of said groove, and curing said rubber body after winding it about the core.

4. The method of forming a rotary broom as recited in claim 3, including forming in said outwardly projecting portion of the rubber body as it is extruded, a passage extending longitudinally therethrough.

5. The method of forming a rotary broom that includes applying an uncured rubber cement to the outer surface of a metal broom core, extruding a mass of uncured rubber to form an elongated body thereof, winding said body of uncured rubber helically about said core member, shaping said rubber during said extrusion to give a cross section having a portion projecting radially outwardly from said core and containing an inner helical passage and between successive turns of which is formed an outwardly facing helical bristle receiving groove, said extruded rubber body having reduced dimension portions extending laterally from said outwardly projecting portion and received axially between said turns of the outwardly projecting portion to form an inner helical wall of said groove, helically wrapping a flexible tape about said outwardly projecting portion of the rubber body, helically wrapping a flexible tape about said reduced dimension portion of the rubber body, then heating and thereby curing said rubber body and cement under pressure by surrounding them with steam under pressure and vulcanizing the rubber body to the core by said heat, and then removing said tape from the rubber body.

6. The method of forming a rotary broom that includes forming an elongated body of at least partially uncured rubber, winding said body of rubber helically about a broom core member, said rubber body being of such cross section as to have a portion projecting radially outwardly from the core between successive turns of which is formed an outwardly facing helical groove for receiving bristles, curing said rubber body after winding it about the core but prior to the insertion of bristles into the groove, and then removably filling bristles into said groove after said curing of said rubber body.

7. The method of forming a rotary broom that includes forming an elongated body of at least partially uncured rubber, winding said body of rubber helically about a broom core member, said rubber body being of such cross section as to have a portion projecting radially outwardly from the core between successive turns of which is formed an outwardly facing helical groove for receiving bristles, and curing said rubber body after winding it about the core but prior to the insertion of bristles into the groove, to thereby avoid bonding of the bristles to the rubber body and allow for removal and replacement of the bristles.

8. The method as recited in claim 7, including applying an uncured rubber cement to the outer surface of said core meber prior to the application of said rubber body thereto, and curing said cement at the same time as said rubber body to bond the latter to the core member.

9. The method as recited in claim 7, in which said elongated rubber body is formed by extruding a mass of at least partially uncured rubber to said elongated shape.

References Cited in the file of this patent
UNITED STATES PATENTS

| | | |
|---|---|---|
| 737,381 | Franz | Aug. 25, 1903 |
| 1,721,062 | Angell | July 16, 1929 |
| 2,045,373 | Scully | June 23, 1936 |
| 2,261,768 | Jones | Nov. 4, 1941 |
| 2,295,823 | Banigan | Sept. 15, 1942 |
| 2,573,440 | Henning | Oct. 30, 1951 |
| 2,604,362 | Sugerman | July 22, 1952 |